US005837986A

United States Patent [19]
Barile et al.

[11] Patent Number: 5,837,986
[45] Date of Patent: Nov. 17, 1998

[54] MODIFICATION OF SOFTWARE FILES IN A MICROPROCESSOR-CONTROLLED DEVICE VIA TWO-DIMENSIONAL BAR CODE SYMBOLS

[75] Inventors: John Barile, Holbrook; Steven Chew, East Northport; Jerome Swartz, Old Field, all of N.Y.

[73] Assignee: Symbol Technologies, Inc., Holtsville, N.Y.

[21] Appl. No.: 728,397

[22] Filed: Oct. 9, 1996

Related U.S. Application Data

[63] Continuation of Ser. No. 268,075, Jun. 28, 1994, abandoned, which is a continuation-in-part of Ser. No. 126,965, Sep. 27, 1993, Pat. No. 5,399,846, which is a division of Ser. No. 461,881, Jan. 5, 1990, Pat. No. 5,304,786.

[51] Int. Cl.[6] .................................................. G06K 7/10
[52] U.S. Cl. .......................................... 235/462; 235/487
[58] Field of Search .................................. 235/462, 472, 235/494, 487

[56] References Cited

U.S. PATENT DOCUMENTS

| | | | |
|---|---|---|---|
| 3,991,300 | 11/1976 | Chadima, Jr. ........................... | 235/494 |
| 4,074,114 | 2/1978 | Dobras ................................. | 235/494 X |
| 4,114,033 | 9/1978 | Okamoto et al. ....................... | 235/494 |
| 4,782,221 | 11/1988 | Brass et al. ............................ | 235/494 |
| 4,794,239 | 12/1988 | Allias ..................................... | 235/462 |
| 5,113,445 | 5/1992 | Wang ...................................... | 380/51 |
| 5,132,716 | 7/1992 | Samuels et al. ....................... | 354/322 |
| 5,159,635 | 10/1992 | Wang ...................................... | 380/51 |
| 5,210,854 | 5/1993 | Beaverton et al. ..................... | 395/500 |
| 5,243,655 | 9/1993 | Wang ...................................... | 380/51 |
| 5,278,759 | 1/1994 | Berra et al. .......................... | 364/424.01 |
| 5,304,786 | 4/1994 | Pavlidis et al. ........................ | 235/462 |
| 5,399,846 | 3/1995 | Pavlidis et al. ........................ | 235/462 |

FOREIGN PATENT DOCUMENTS

| | | |
|---|---|---|
| 0 265 148 A2 | 4/1988 | European Pat. Off. . |
| 1-226088 | 9/1989 | Japan . |

OTHER PUBLICATIONS

PDF417 Specification, copyright 1991 Symbol Technologies, Inc.

*Primary Examiner*—Donald T. Hajec
*Assistant Examiner*—Karl Frech

[57] ABSTRACT

A microprocessor-controlled device with software files stored in non-volatile memory which can be easily modified by the user by reading or scanning a two-dimensional bar code symbol having program modification information encoded thereon. The symbol can be read by two-dimensional or one-dimensional laser or CCD based means. Depending on its size, either the entire file can be replaced, selected locations can be replaced, or selected relocatable object files can be linked at the target device in order to effect the program revision.

10 Claims, 5 Drawing Sheets

MODIFICATION OF SOFTWARE FILES IN A MICROPROCESSOR-CONTROLLED DEVICE VIA TWO-DIMENSIONAL BAR CODE SYMBOLS

CROSS-REFERENCE TO RELATED APPLICATIONS

This is a continuation of application Ser. No. 08/268,075 filed Jun. 28, 1994 which application is now abandoned which is a continuation-in-part of application Ser. No. 08/126,965, filed on Sep. 27, 1993, now U.S. Pat. No. 5,399,846, which is a divisional application of Ser. No. 07/461,881, filed Jan. 5, 1990, now U.S. Pat. No. 5,304,786, which is incorporated by reference herein.

BACKGROUND OF THE INVENTION

1. Field of the Invention

This application relates to a microprocessor-controlled device with software files stored in non-volatile memory which can be easily modified by the user, and in particular to such devices which can be modified by the user reading or scanning a two-dimensional bar code symbol having program modification information encoded thereon.

2. Description of the Prior Art

Executable software programs which are used to run microprocessor-controlled devices such as portable data terminals are stored in some type of non-volatile memory device such as a read-only memory (ROM) or a programmable read-only memory (PROM). Often, a user of the device needs to modify the executable code in order to implement a software revision released by the manufacturer. To modify the executable code, it has been necessary to physically change the ROM or PROM (or a circuit board upon which the memory device is mounted). This physical replacement process is expensive and intrusive and results in undesired down time. The replacement will likely need to be done by a qualified service technician, which is a costly process borne by the user or the manufacturer.

An Electrically Erasable PROM (EEPROM) is a form of non-volatile ROM which can be re-programmed by electrical control and timing signals while the device remains in its circuit, i.e. without physical removal and replacement. In addition, a new type of EEPROM know as a "flash memory", has also become available. A flash memory chip is like an EEPROM in terms of being electrically erasable and re-programmable. Thus, EEPROM and flash memory devices have been used to store executable files so that the executable files can be modified in the field. However, the prior art methods and systems of modifying the code in an EEPROM or flash memory have required communications to a mass storage device in a central computer through a modem connection or the like in order to download the updated files. This is disadvantageous since it requires that the device be configured to communicate with a modem, and the device must have access to phone lines capable of communicating with the modem.

It is thus desired to be able to modify the executable code resident in a microprocessor-based device in an "in-circuit" fashion, i.e. without physically changing the memory device, and in a portable and convenient manner. It is also desired to be able to modify non-executable files such as data tables resident in a microprocessor-controlled device in a similar fashion.

The scanning of bar codes, which are linear symbols comprising alternating bars and spaces of varying widths for the encoding of data, have been used in the prior art as a convenient means for the user to input certain programmable parameters into the bar code scanner as desired. Parameters that are programmable and the current state of these parameters are stored in a table in memory. The user can program or re-program a parameter by scanning a specific bar code out of a group of available bar codes provided in the user's manual, which specifies the table entry location and the new value to be set for that particular parameter. This method of customizing a bar code scanner is cumbersome and limited, since linear bar codes carry only a few bytes of data. In addition, this practice has been limited to modifying simple data parameters in a table, and has not been implemented to modify the executable code utilized to actually run the device microprocessor.

It is therefore an object of the present invention to provide a microprocessor-controlled device which is capable of being easily re-programmed by the user so as to revise its software files resident in a non-volatile memory device without physically replacing the memory device.

It is also an object of the present invention to provide a system for modifying software files resident in non-volatile memory in a microprocessor-controlled device without the need to replace the memory device.

It is a further object of the present invention to provide a medium for re-programming the microprocessor-controlled device which is relatively inexpensive and easy to distribute to a large number of users.

It is a further object of the present invention to provide a microprocessor-controlled device which can be reprogrammed by the user in a portable manner, without requiring access to phone lines for modem communications, devices for reading magnetic or optical disks or mass storage units or the like.

It is an even further object of the present invention to provide a microprocessor-controlled device which can be reprogrammed by the user by using a hardware apparatus already within or coupled to the device so as to eliminate the need to provide additional hardware for such re-programming purposes.

SUMMARY OF THE INVENTION

In accordance with these and other objects, provided is a system for modifying an original software file resident in a microprocessor-controlled device to an updated software file. In a first embodiment of the invention, which is particularly useful when the file to be updated is relatively small, the system comprises means for encoding the updated software file into a two-dimensional bar code symbol to be printed on a substrate. Means for reading the encoded two dimensional bar code symbol from the substrate and for decoding the symbol into the updated software file are coupled to the microprocessor-controlled device. The device also has means for replacing the original software file with the updated file in non-volatile memory.

In a second embodiment of the invention, which is particularly useful when program changes occur in table values or when changes do not cause shifting of addresses of program modules, the system comprises difference extractor means for comparing the original file with the updated file and for providing a list of addresses where the original file differs from the updated file and the updated bytes of data located at the addresses, means for generating file modification data records representative of the differences between the original software file and the updated software file, and means for encoding the file modification data into a two-dimensional bar code symbol to be printed onto a substrate. The modification data records each comprise the address of data to be changed, a byte count to indicate the number of consecutive bytes to be changed, an operator to define how the revised data bytes are to be integrated into the target file, and the data bytes of revised information. The operator may be an assignment of the entire byte, or it may be a masking function defined by a logical AND, OR, or XOR operator. Means for reading the encoded two-dimensional bar code symbol from the substrate and for decoding the symbol into the file modification data records are coupled to the microprocessor-controlled device. The microprocessor-controlled device also has means for merging the file modification data with the original software file resident therein in accordance with the decoded operator function so as to recreate the updated software file, and means for replacing portions of the original software file resident in non-volatile memory therein with the updated bytes.

In a third embodiment of the invention, which is particularly useful when only specific relocatable object files are to be replaced in the original file, only those relocatable object files which have been changed are transferred to the target device. The system in this embodiment comprises means for encoding the new relocatable object files into a two-dimensional bar code symbol to be printed onto a substrate. Means for reading the encoded two-dimensional bar code symbol from the substrate and for decoding the symbol into the new relocatable object files are coupled to the microprocessor-controlled device. The microprocessor-controlled device also has means for linking the new relocatable object files with the original software file resident therein so as to recreate the updated software file, and means for replacing the original software file resident in non-volatile memory therein with the updated software file. Since any or all of the above embodiments may be used in a particular device, a software program and/or control logic resides within the device which facilitates the modification process of the present invention. The modification data records encoded into the two-dimensional bar codes also contain information directing the device as to how and where to perform the updates.

An exemplary microprocessor-controlled device which can be modified by the present invention is a portable data collection terminal used for inventory control purposes, which has connected thereto a handheld laser based or CCD based scanner for data acquisition. In this case, the scanner can be advantageously used to read into the terminal a two-dimensional bar code symbol containing software modification data in accordance with the present invention in order to revise the non-volatile memory is desired. In addition to revising software files resident in a device to which a two-dimensional bar code symbol reading device is connected, the present invention may be implemented in order to revise software files resident in the two-dimensional bar code symbol reading device itself.

The present invention is applicable to revise both executable code as well as non-executable files such as data tables.

DESCRIPTION OF TITE PREFERRED EMBODIMENT

Figure 1:
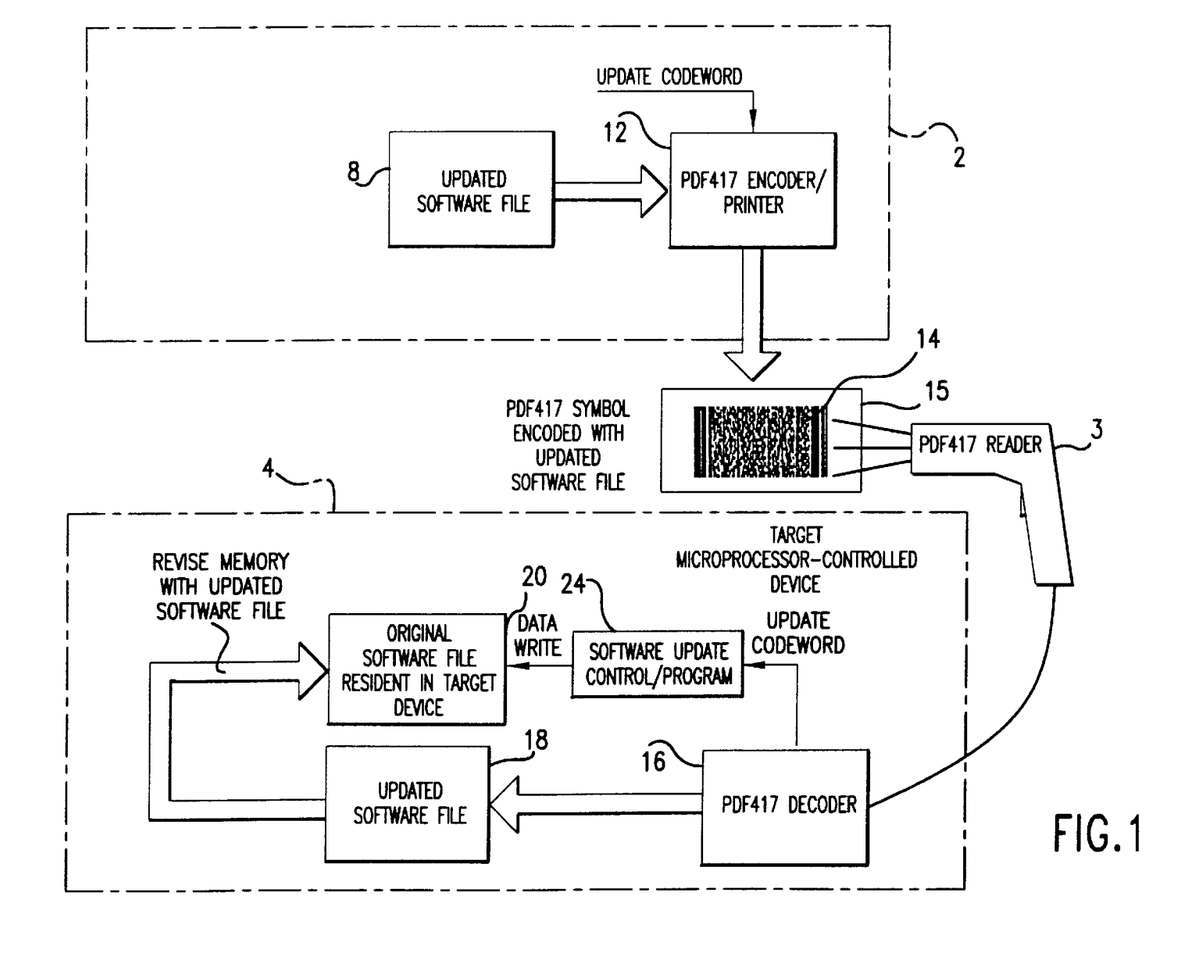
FIG. 1 is a block diagram of the first embodiment of the system of the present invention for completely replacing an original software file resident in a microprocessor-controlled device with an updated software file.

The preferred embodiment of a system of the present invention which completely replaces the original software file with anupdated software file is now described with reference to the block diagram in FIG. 1. The system shown in FIG. 1 has a non-volatile memory within a target microprocessor-controlled device 4, such as a data collection terminal, which is to be re-programmed by the present invention, a host computer 2 for encoding an entire updated software file 8 into a suitable two-dimensional bar code symbol 14 and for printing it onto a substrate 15, and a reading device 3 coupled to the target device 4 for reading the symbol 14 from the substrate 15.

Since linear bar codes can carry only a few bytes of data, the use of a two-dimensional bar code symbology is used in order to be able to encode a meaningful amount of data onto the substrate for re-programming the target device 4 in accordance with the present invention. In the preferred embodiment, a two-dimensional symbology referred to as PDF417 is implemented due to its high density, robust error detection and correction capability, and compatibility with both laser based and CCD based reading devices. The PDF ("Portable Data File") format is capable of representing many bytes of data in a symbol on the order of a few square inches in size. In addition, in accordance with a variant referred to as Macro-PDF, numerous PDF symbols can be concatenated in order to provide ample data capacity as desired PDF417 Symbology As disclosed in U.S. Pat. No. 5,304,786, which is incorporated by reference herein, the PDF417 two-dimensional bar code symbol comprises multiple rows of codewords. Each codeword is a mark pattern comprising a plurality of elements of marks; the marks can be of various heights, as in a linear bar code, or can be of a relatively small height to form a "dot code." Not just any mark pattern can constitute a codeword, however; each codeword belongs to a specific family or "set" of mark patterns that conforms to a particular descriptive rule about some characteristic of each mark pattern, e.g., a rule about the width of each mark and the total width of each mark pattern.

The codewords in any two adjacent rows are written in mutually exclusive subsets of the mark-pattern set (although in some embodiments the union of the subsets is not exhaustive of the set itself). In particular, each subset of the mark-pattern set is defined so that it includes, as valid codewords for that subset, only those mark patterns that satisfy certain discriminator-function criteria.

Such row-wise usage of alternating subsets of codewords, grouped according to discriminator-function criteria, permits quick determination whether a row has been crossed during scanning, without the need for a horizontal guard bar. That is, for a given scanned codeword in a label, determination of the discriminator function indicates whether the codeword comes from the same row as the previously-scanned codeword or from a different row (that is, whether the scan line has crossed between rows).

Detection of line-crossing permits "stitching" of partial scans of particular rows into a map (e.g., in memory) of the label. The stitching process is roughly analogous to stitching a number of pieces of colored fabric into a pre-designed quilt that displays, e.g., a picture as each "piece" is acquired by die scanning process, it is incorporated piecewise into the appropriate point.

For example, suppose that computation of the appropriate discriminator functions reveals that a scanning pass has scanned the first half of row 1 and the second half of row 2 of a label comprising multiple rows of codewords. Assume that the respective longitudes of the scanned data with respect to the ends of the label are known, e.g., through detection of start- and/or stop- codes. The knowledge that a row boundary has been crossed permits all the scanned data from the scanning pass to be incorporated into the respective proper rows of the label map at the respective proper longitudes (assuming no scanning or decoding errors); the data from the scanning pass need not be discarded merely because the data did not all come from a single desired row.

Consequently, the operator need not be scrupulously careful to sweep the reader over the label one row at a time; virtually any scanning pass that includes either a row's start code or a stop code, or that can somehow be determined to overlap with data already incorporated in the label map, will yield usable data (assuming no coding or decoding errors). A label in accordance with the invention thus advantageously increases the density of information by permitting height reductions in the codewords.

As noted above, a key feature of the PDF417 symbology is the use of different codeword subsets in different rows, each subset satisfying certain discriminator-function criteria. In the preferred embodiment described here for illustrative purposes, a (17,4) symbology is used (hence the term PDF417). A discriminator function is used to divide the 11,400 available mark patterns in the symbology into three mark-pattern subsets of 929 codewords each.

The discriminator function may take as its inputs the various widths of the on- and off marks of a mark pattern (e.g., optically detectable bars and spaces) and may provide as an output a number from 0 to 8. Three subsets may then be selected whose discriminator function values are 0, 3, and 6, respectively, and whose mark widths meet certain other criteria. Each subset thus comprises a collection of codewords, all of whose discriminator functions are both equal to each other and readily distinguishable from those of the codewords in the other two subsets.

The availability of 929 codewords in each subset, each with a unique discriminatory-function number, permits each codeword to be used to represent a two-digit number in base 30. This capability leads to several advantages.

Each digit of the two-digit base-30 number can be used in an "alpha mode" or in a "mixed mode"; that is, each digit can be mapped into a 30-place alphabetic translator table or into a 30-place mixed alphanumeric translation table. In each of these 30-place tables, one or more digits are reserved for use a signals to change translation tables.

Alternatively, each two-digit number can be used in a "numeric mode" or in a "user mode"; that is, each number can be mapped into a 929-place numeric translation table or into any of up to twenty-seven 929-place user-defined translation tables. In each of these tables as well, one or more digits are reserved for use as signals to begin using a different translation table.

Stitching is facilitated by using different discriminator functions in alternate rows, selected so that the scanner can make a local decision on whether a row has been crossed. Using different discriminator functions in alternate rows allows the elimination of horizontal guard bars seen in prior art Code symbologies, thus permitting higher density of information.

The illustrative embodiment of toe present invention utilizes an advantageous scheme for organizing codewords into readily distinguishable groups. The scheme makes use of the principle of coding theorem to pick only a fraction of available mark patterns as legal code words to increase decoding reliability; it can be applied to any of a number of labels.

In particular, the two-dimensional bar code symbol implemented in the preferred embodiments of the present invention includes at least two rows of codewords, with one row of codewords adjacent to and beneath another row. Each codeword represents at least one information-bearing character and is selected from among a set of detectable mark/space patterns, wherein each mark/space pattern has a determinable discriminator function value and comprises a pattern of marks and spaces. Each mark and space is representative of one of a plurality of different states. The codewords in each row have codewords selected from one of a plurality of subsets of mark/space patterns, each said subset comprising mark/space patterns having discriminator function values that are mutually exclusive of discriminator values corresponding to the mark/space patterns comprising any other subset.

Further details regarding implementation of the PDF417 symbology can be found in U.S. Pat. No. 5,304,786.

A PDF417 encoder/printer device 12 is resident in the host computer 2 in order to encode the updated software file 8 and print it as the two-dimensional bar code symbol 14 in accordance with the above-referenced symbology.

Symbol Reading Device

Various reading devices may be used to implement the reader 3 for reading the PDF417 symbol 14 in accordance with the present invention. For example, a laser based two-dimensional raster scanner market by Symbol Technologies, Inc., the assignee of the present application, as the PDF 1000 Hand-Held PDF417 Scanner is used in the preferred embodiment. The PDF 1000 Scanner produces a sweeping laser beam which scans its target horizontally over 500 times per second, as compared to the 36 times per second of conventional point-of-sale linear bar code scanners. It also rasters vertically at 12 Hz in order to fully capture the two-dimensional bar code symbol 14.

The rastering operation of a two-dimensional rastering laser scanner used to read the symbol 14 is also described in U.S. Pat. No. 5,235,167, which is incorporated by reference herein. As disclosed in said patent, and referring to FIG. 4 herein, there is shown a highly simplified embodiment of one type of reader that may be used to read a two-dimensional PDF417 symbol in accordance with the present invention. The reader is implemented in a housing 155 that includes a exit port 156 through which an outgoing laser light beam 151 is directed to impinge on, and to be scanned across, the PDF417 symbols 14 located on the substrate 15 exterior of the housing.

Figure 4:
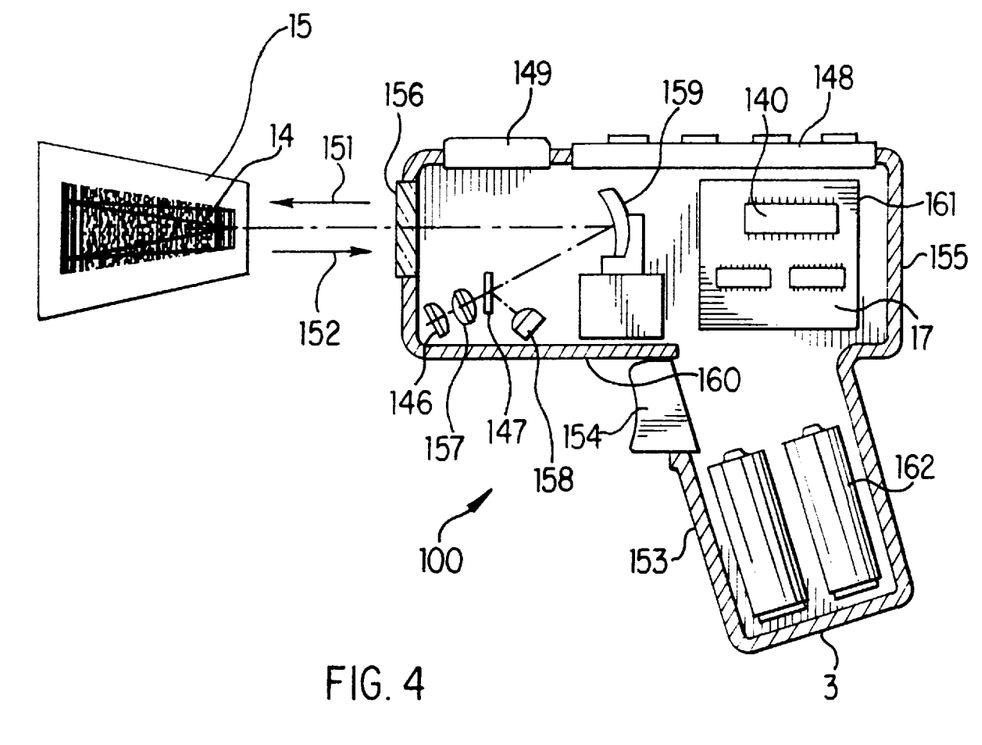
FIG. 4 is an illustration of a hand-held laser scanning device used to implement the preferred embodiment of the present invention.

An outgoing light beam 151 is generated in the reader 3, usually by a laser diode or the like, and directed to impinge upon the symbol 14 disposed on the substrate 15 a few inches from the front of the reader unit. The outgoing beam 151 is scanned in a linear raster scan pattern, and the user positions the hand-held unit so this scan pattern transverses the symbol 14 to be read. Reflected and/or scattered light 152 from the symbol is detected by a light-responsive device 158 in the reader unit 3, producing serial electrical signals to be processed and decoded for reproducing the data represented by the symbol. As used hereinafter, the term "reflected light" shall mean reflected and/or scattered light.

The reader 3 is a gun shaped device, having a pistol-grip type of handle 153. A movable trigger 154 is employed to allow the user to activate the light beam 151 and detector circuitry when the user has positioned the device to point at the symbol to be read. A light-weight plastic housing 155 contains the laser light source 146, the detector 158, the optics 157, 147, 159, signal processing circuitry including a detector 17, and the CPU 140 as well as power source or battery 162 A light-transmissive window 156 in the front end of the housing 155 allows the ou+going light beam 151 to exit and the incoming reflected light 152 to enter. The reader 3 is designed to be aimed at the symbol 14 by the user from a position in which the reader 3 is spaced from the symbol, i.e., not touching the symbol or moving across the Symbol. Typically, this type of hand-held reader is specified to operate in the range of perhaps several inches.

The reader 3 may also function as a portable computer terminal, and include a keyboard 148 and a display 149, such as described in the previously noted U.S. Pat. No. 4,409,470.

As further depicted in FIG. 4, a suitable lens 157 (or multiple lens system) may be used to focus the scanned beam into the bar code symbol at an appropriate reference plane. A light source 146 such as a semiconductor laser diode is positioned to introduce a light beam into the axis of the lens 157, and the beam passes through a partially-silvered mirror 147 and other lenses or beam-shaping structure as needed, along with an oscillating mirror 159 which is attached to a scanning motor 160 activated when the trigger 154 is pulled. If the light produced by the source 146 is not visible, an aiming light may be included in the optical system. The aiming light, if needed, produces a visible-light spot which may be fixed, or scanned just like the laser beam; the user employs this visible light to aim the reader unit at the symbol.

In addition to a two-dimensional rastering type laser scanner described above, a conventional single line sweeping laser scanner may be used to implement the preferred embodiment of the present invention. For example, the LS2000 hand held laser scanner marketed by Symbol Technologies, Inc. may be used by aligning the horizontal laser sweep across the top row of the PDF417 symbol 14 and manually swiping it in a downwards direction in order to capture the entire symbol. The row stitching capabilities of the PDF symbology as discussed above enables the use of such a single line laser device if a two-dimensional rastering scanner is unavailable.

Laser scanners are not the only type of optical instrument capable of reading two-dimensional bar code symbols. Another type of reader is one which incorporates detectors based upon charge coupled device (CCD) technology. In such readers, size of the detector is larger than or substantially the same as the symbol to be read. The entire symbol is flooded with light from the reader, and a linear (or two-dimensional) CCD array detects the light reflected from the entire bar code. The CCD output is then digitized and decoded in a similar manner in order to provide the data originally encoded onto the bar code. Although a laser-based reader is used in the preferred embodiment, CCD based readers are suitable as well. CCD based readers are available in two-dimensional arrays, which capture the entire symbol simultaneously, and one-dimensional linear arrays, which must be swept across the symbol by the user in the same manner as the linear laser readers.

PDF417 Decoding

After the reader 3 has scanned the symbol 14, a PDF417 decoder 16 resident in the target device 4 functions to decode the digitized data stream so as to generate an updated software file 18 as originally generated in the host computer 2. The decoding method implemented in the preferred embodiment advantageously makes use of the symbology organization of PDF. In the first step, when a-codeword is scanned, the discriminator function of the scanned codeword is computed to determine the codeword subset of which the scanned codeword is a member. A t-sequence number based on the width of the marks comprising the codeword is also computed; that number is used as an entry point into a lookup table for the codeword subset in question. The lookup table yields a number from 0 to 928, which is parsed into a two-digit number in base 30.

In the second step, the high- and low-order digits of the base-30 number are used to determine the symbolic meaning assigned to the codeword (which may include an instruction to change translation tables).

This method thus advantageously permits the user to define multiple translation tables. In addition, the invention is not constrained by logical limits on the number of codewords per row nor on the number of rows. This gives the user freedom to lay out the symbology in areas of varying shapes.

Further details of the decoding methodology are found in U.S. Pat. No. 5,304,786.

Revising the Non-Volatile Memory

The original software file is resident in the device 4 in a flash memory 20, which is a non-volatile memory with in-circuit electrical modification capabilities similar to a conventional Random Access Memory device (RAM). In addition, a software update program is stored in non-volatile memory as well. The PDF417 symbol 14 is encoded to include an update codeword as well as the updated software file 8. The Update codeword functions as a flag to instruct the target device 4 that the data encoded in the symbol 14 is a software file to be written into the memory 20. This program is accessed by a software update control function 24 when a system software update is initiated by detecting the Update codeword from the PDF417 symbol 14. Thus, in order to revise the original file, the flash memory 20 is accessed by the software update control 24, which provides timing and control signals effective to write the decoded updated software file 18 into the memory 20 at the appropriate time.

Figure 2:
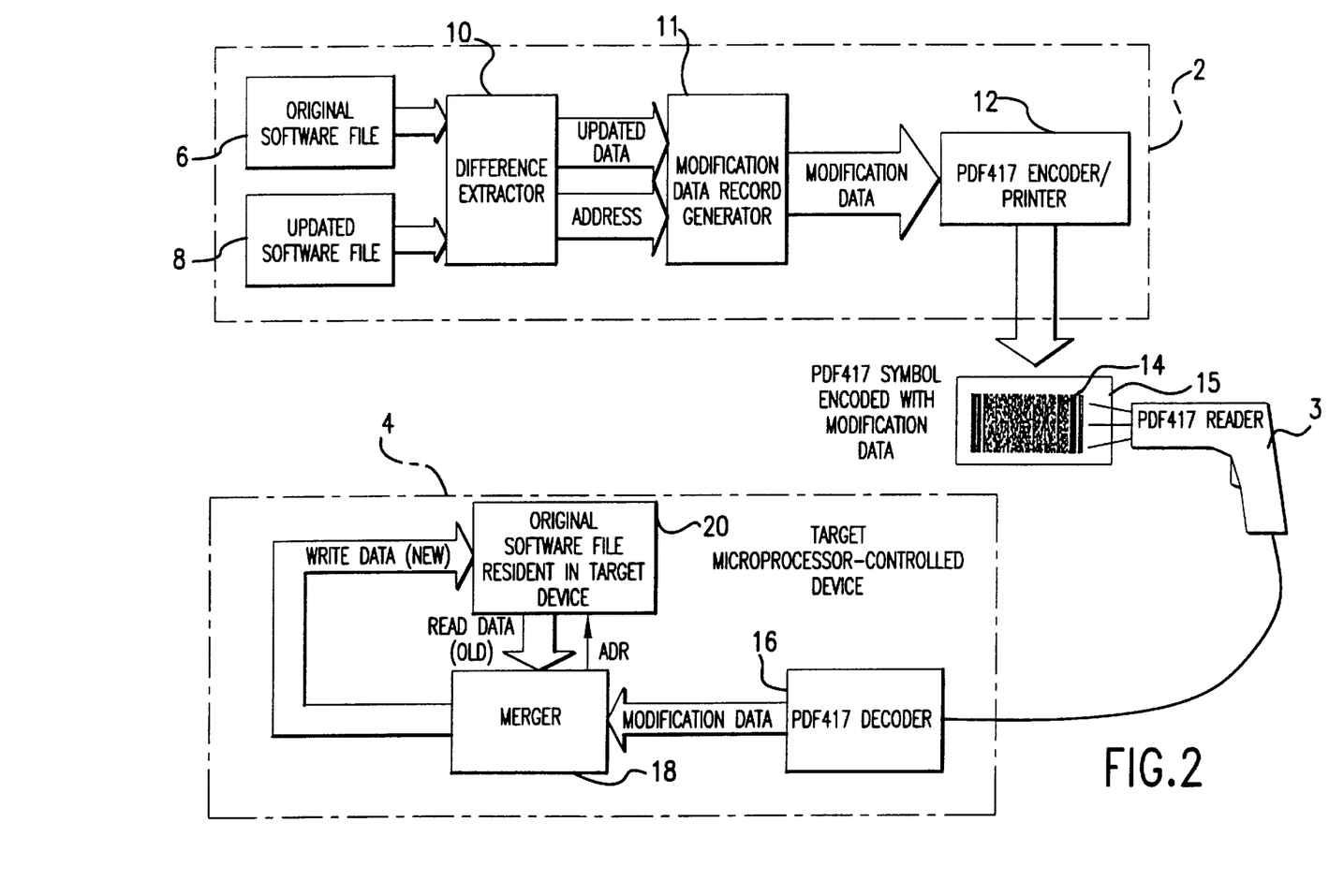
FIG. 2 is a block diagram of the second embodiment of the system of the present invention for changing only certain locations in the original software file in order to generate the updated software file.
Figure 2A:
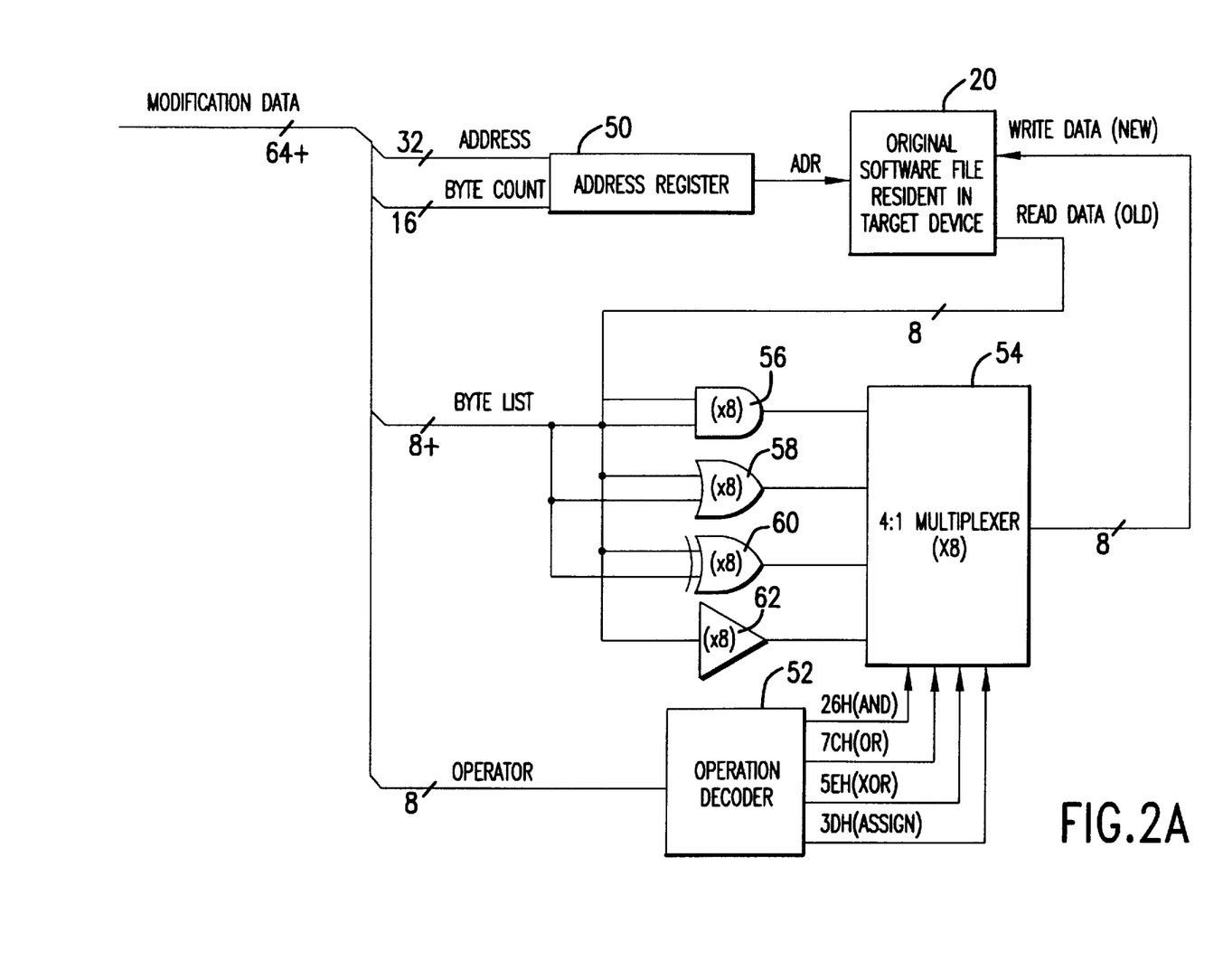
FIG. 2A is a block diagram of a merger function which is implemented by the embodiment of FIG. 2.

This embodiment of updating the entire software file is useful only when the file is small enough to fit into one or a manageable number of concatenated PDF417 symbols. When the file is relatively large, however, and the number of changes are relatively small, an alternative modification method is used. Referring to FIGS. 2 and 2A, where like elements set forth in FIG. 1 are given like reference numerals, a file of records comprising modification data is generated at the host computer 2, encoded into a PDF417 symbol 14, read by the reader 3, decoded at the target device 4 and merged with the original file in memory 20 to recreate the updated file In order to implement this partial replacement embodiment of the present invention, the host computer 2 has stored in its memory space an identical copy 6 of the original software file resident in the memory 20 of the target device 4 as well as the updated software file 8 which is desired to be loaded into the target device 4. The host computer 2 also has resident thereon a difference extractor 10 which compares two software files and generates an output file containing a list of differences between them. In particular, the difference extractor 10 is configured to Had the original software file 6 and the updated software file 8. The difference extractor 10, compares the two files and generates (a) a list of locations where the data in the original file has been changed and (b) the data found at those locations. Thus, rather than replacing the entire contents of the flash memory 20 in the target device 4, this embodiment only revises those locations which differ between the original file and the updated file.

The difference extractor 10 can be implemented by any means known in the art for obtaining such information. For example, a prior art program known as cmp is available for use in the UNIX operating environment. When given two binary files as input, cmp compares the two files byte by byte. Whenever the two bytes at the same location differ, the address of the bytes and the two differing byte values are output. The difference extractor 10 takes the output information from a utility such as CMP and outputs the list of changed locations to a modification data record generator 11, which packs the data in accordance with a predefined syntax as described below.

The modification data specifies how the original file is to be changed in order to recreate the updated file. The modification data is composed of a set of formatted records, each representing a continuous block of data locations and their corresponding new values relative to the original values. The smallest addressable quantity in the modification data is an eight-bit byte. The syntax of the modification data is described below in Table A in BNF (Backus-Naur Form):

TABLE A

MODIFICATION DATA SYNTAX

```
<mod_data>       =>  <record_list>
<record_list>    =>  <record>
                 |   <record><record_list>
<record>         =>  <address><operator><byte_count><byte_list>
<address>        =>  <32_bit_number>
<32_bit_number>  =>  byte3 byte2 byte1 byte0
<16_bit_number>  =>  byte1 byte0
<byte_count>     =>  <16_bit_number>
<16_bit_number>  =>  byte 1 byte0
<operator>       =>  =
                 |   &
                 |   |
                 |   ^
<byte_list>      =>  byte
                 |   byte <byte_list>
```

In the BNF syntax description of Table A, every item inside a set of angle brackets (◇) is a non-terminal, meaning that it is made up of other items. Those without the angle brackets are known as terminals, which cannot be further decomposed.

The modification data is composed of one or more records. Each record contains a 32-bit address (4 bytes), an operator, a 16-bit byte count (2 bytes), and a sequence of bytes (byte list). The operator specifies how the byte list in the record is applied to change the byte values, whose starting address corresponds to the address in the original file to accomplish the modification. The four different operators defined allow the modification of individual bits, without affecting other bits in the same byte, even though the smallest addressable quantity is a byte.

Table B contains definitions of all the terminals.

TABLE B

| Terminal | TERMINAL DEFINITION |
|---|---|
| | Definition |
| byte0 | The least significant byte of a 16-bit number or 32-bit number. |
| byte1 | The most significant byte of a 16-bit number or the third most significant byte of a 32-bit number. |
| byte2 | The second most significant byte of a 32-bit number. |
| byte3 | The most significant byte of a 32-bit number. |
| byte | An 8-bit value. |
| = | Assignment operator -- bytes in record are to completely replace old bytes at the same locations in updated file. This operator is stored as 3D in hex format. |
| & | AND operator -- bytes in record are to be bit-wise logically ANDed with old bytes at the same locations in updated file. This operator is stored as 26 in hex format. |
| \| | OR operator -- bytes in record are to be bit-wise logically ORed with old bytes at the same locations in updated file. This operator is stored as 7C in hex format. |
| ^ | XOR operator -- bytes in record are to be bit-wise logically EXCLUSIVE-ORed with old bytes at the same locations in updated file. This operator is stored as "E in hex format. |

The following examples illustrate how the four different operators can be used to effectively update a file. The first column in each listing is the address, in hex format, of the first byte in that line. The middle column are the bytes, in hex, in those locations. There are 16 bytes in each line.

EXAMPLE 1

The use of the assignment operator in a record specifies the direct substitution of a sequence of bytes in the original file by the byte list in the record. This is useful where the contents of the entire byte to be changed is known and can thus be specified. In this example, the underlined byte at address 034A56 is changed from 34 to 35:

| Address | Data | | | | | | | | | | | | | | | |
|---|---|---|---|---|---|---|---|---|---|---|---|---|---|---|---|---|
| | Original file listing: | | | | | | | | | | | | | | | |
| 034A40 | 50 | 82 | 43 | 6F | 70 | 79 | 72 | 69–67 | 68 | 74 | 20 | A9 | 20 | 31 | 39 | |
| 034A50 | 39 | 33 | 2D | 31 | 39 | 39 | <u>34</u> | 20–53 | 79 | 6D | 62 | 6F | 6C | 20 | 54 | |
| 034A60 | 65 | 63 | 68 | 6E | 6F | 6C | 6F | 67–69 | 65 | 73 | 2C | 20 | 49 | 6E | 63 | |
| 034A70 | 2E | 00 | 60 | 35 | 00 | 5C | 00 | 49–00 | 0B | 00 | FF | FF | 00 | 00 | 02 | |
| | New file listing: | | | | | | | | | | | | | | | |
| 034A40 | 50 | 82 | 43 | 6F | 70 | 79 | 72 | 69–67 | 68 | 74 | 20 | A9 | 20 | 31 | 39 | |
| 034A50 | 39 | 33 | 2D | 31 | 39 | 39 | <u>35</u> | 20–53 | 79 | 6D | 62 | 6F | 6C | 20 | 54 | |

-continued

| Address | Data | | | | | | | | | | | | | |
|---|---|---|---|---|---|---|---|---|---|---|---|---|---|---|
| 034A60 | 65 | 63 | 68 | 6E | 6F | 6C | 6F | 67–69 | 65 | 73 | 2C | 20 | 49 | 6E | 63 |
| 034A70 | 2E | 00 | 00 | 35 | 00 | 5C | 00 | 49–00 | 0B | 00 | FF | FF | 00 | 00 | 02 |

The modification data listing is therefore 00034A56 3D 0001 35, where the 32-bit address is 00034A56 (leading zeroes added), the operator is 3D to indicate an assignment of the entire byte, the byte count is 0001 (only one byte changed), and the new data is 35.

In some applications, certain memory locations are used to store data in a dynamic fashion; that is, the bits may be reconfigured by the user or the device itself under certain conditions. When these bits are packed in a byte alongside bits which are desired to be modified by the present invention, the assignment operator cannot be used on the entire byte since the state of the dynamic bits are likely unknown, and should be left unchanged by the modification. The AND, OR and EXCLUSIVE-OR operators allow the programmer to mask out the bits which should be left unchanged, regardless of their state. Thus, where the bits to be modified are to be set to a 0, the AND operator should be used as shown in Example 2; and when the bits to be modified are to be set to a 1, the OR operator should be used as shown in Example 3. When the programmer does not know the state of the bit to be modified, but simply wants to invert the bit regardless of its particular state, then the EXCLUSIVE OR operator should be used as in Example 4.

EXAMPLE 2

The use of the AND operator in a record allows individual bits within a byte to be set to 0. Each bit that is 0 in the byte list will force the corresponding bits in the original file to be 0. Referring to the listing of Example 1, and assuming that the programmer wants to set the least significant bit of the byte at location 034A60 to 0 but does not want to affect the value of the other bits (which he does not know), then the programmer will use the AND mask 1111 1110 (FE).

The modification data listing is therefore 00034A60 26 0001 FE, where the 32-bit address is 00034A60 (leading zeroes added), the operator is 26 to indicate an AND operation of the data, the byte count is 0001 (only one byte changed), and the AND mask is FE. The seven significant bits will pass through and remain in their original state, and the least significant bit will be set to zero by the AND operation.

EXAMPLE 3

The use of the OR operator in a record allows individual bits within a byte to be set to 1. Each bit that is 1 in the byte list will force the corresponding bits in the original file to be 1. Referring to the listing of Example 1, and assuming that the programmer wants to set the second and third least significant bits of the byte at location 034A62 to 1 and the most significant bit at location 034A63 to 1, but does not want to affect the value of the other bits (which he does not know), then the programmer will use the OR mask 0000 0110 (06) at location 034A62 and the OR mask 1000 0000 (80) at location 034A63.

The modification data listing is therefore 00034A62 7C 0002 06 80, where the 32-bit address is 00034A62 (leading zeroes added), the operator is 7C to indicate an OR operation of the data, the byte count is 0002 (two successive bytes changed), and the OR mask is 06 80. The desired bits will be set to a 1 by the OR operation, and the remaining bits will be passed through unchanged as desired.

EXAMPLE 4

The use of the EXCLUSIVE OR operator in a record allows individual bits within a byte to toggle to their opposite state. Each bit that is 1 in the byte list will force the corresponding bits in the original file to toggle from 0 to 1 or from 1 to 0. Referring to the listing of Example 1, and assuming that the programmer wants to set the toggle the least significant bit of the byte at location 034A70 but does not know its particular state and also does not want to affect the value of the other bits (which he also may not know), then the programmer will use the EXCLUSIVE OR mask 0000 0001 (01).

The modification data listing is therefore 00034A70 SE 0001 01, where the 32-bit address is 00034A70 (leading zeroes added), the operator is 5E to indicate an EXCLUSIVE-OR operation of the data, the byte count is 0001 (only one byte changed), and the EXCLUSIVE-OR mask is 01. The seven significant bits will pass through and remain in their original state, and the least significant bit will be toggled by the EXCLUSIVE-OR operation.

The difference data file generated by the difference extractor 10 is configured by the modification data generator 11 into modification data records in accordance with the above syntax and examples. The modification data records are then encoded and printed by the encoder/printer 12 into a PDF417 two-dimensional bar code symbol suitable for reading by the target device 4. In addition, a Merger Update codeword is set in a predetermined location in the PDF417 symbol to indicate to the target device 4 that the accompanying data is to be used for merger type re-programming purposes.

Recreating the Updated Software File at the Target Device

After the symbol 14 is read by the reader 3 and decoded by the PDF417 decoder 16, the modification data is used in conjunction with the original software file resident in the target device to recreate the updated software file. The modification data consists of a list of file locations which have been changed, as well as the data changes at those locations and the applicable operator function. A merger function 18 inserts the new data at those locations in the original file as shown in the logic diagram of FIG. 2A. The merger 18 takes the modification data as input and interprets it in order to produce the updated bytes. Since the modification data specifies, in general, the difference between the original file and the new file, the merger 18 requires the original file as the other input. For each record in the modification data, the merger 18 will go to the specified address, for the specified number of bytes in the byte list, to perform the specified operation upon the original file data with the byte list to produce the new file.

An address register 50 uses the address field and the byte count field to generate the address cycle used to fetch data from and write data into the memory 20. The operator field is decoded by a decoder 52 to determine which function should be used (AND, OR, XOR or assign). A 4:1 multiplexer 54 is used to select the outputs of either the AND gates 56, the OR gates 58, the XOR gates 60, or the pass through buffers 62. The multiplexer 54 selects the appropriate input in accordance with the function decoded by the decoder 52, and outputs the data to the write port of the memory 20 for updating the file.

When the assignment operator is specified in the record, the original file data is directly substituted by those in the byte list through the buffers 62. When the AND operator is specified in the record, the original file data is bit-wise ANDed with those in the byte list through the AND gates 56. When the OR operator-is specified in the record, the original file data is bit-wise ORed with those in the byte list through the OR gates 58. When the XOR operator is specified in the record, the original file data is bit-wise exclusive ORed with those in the byte list through the XOR gates 60. The flash memory 20 is then updated one byte at a time. When multiple bytes are to be updated, each one is accessed serially on a byte-by-byte basis. While the new bytes are being determined, the merged data can be written into random access memory (RAM) or other areas of flash memory. When the operation is complete, the modified bytes are written into the program flash area. This prevents partial modification or problems in case of power loss during an update sequence.

Although the function of the merger 18 has been shown with hardware logic functions, it can be easily implemented by a software control program to update the appropriate locations in accordance with the modification data records.

Relocatable File Generation and Recreation

Figure 3:
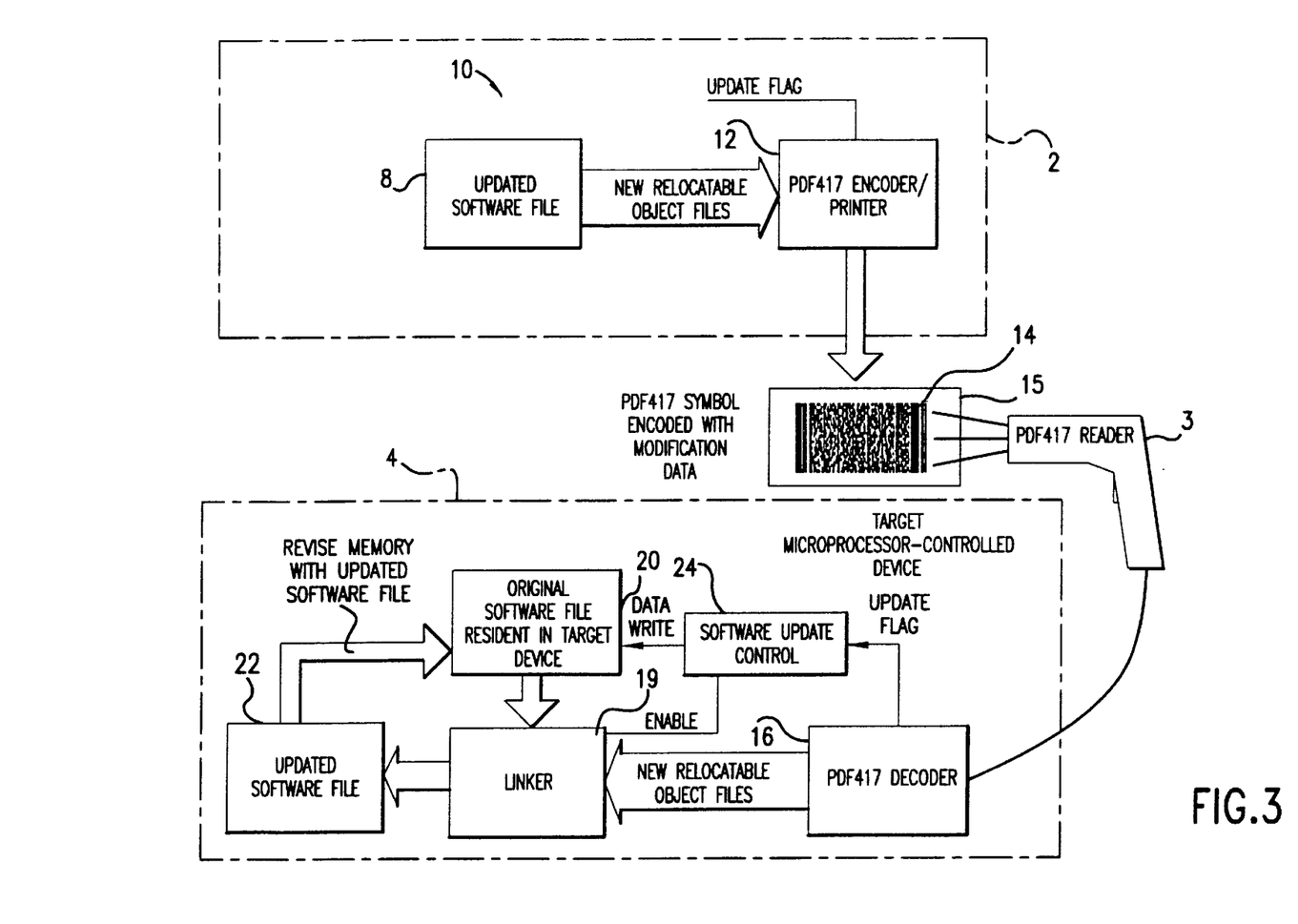
FIG. 3 is a block diagram of the third embodiment of the system of the present invention for replacing certain relocatable object files in the original software file in order to generate the updated software file.

In the third embodiment of the present invention, which is shown in FIG. 3, only those relocatable object files which have been revised are encoded by the encoder 12 and printed into the symbol 14. This embodiment is suitable for use when both the total file replacement method of the first embodiment and the byte-oriented partial replacement method of the second embodiment cannot be used. The first embodiment may be difficult or impossible to use because the size of the executable file is so large that the number of bar code symbols required to store it becomes excessive or the amount of memory required to store the bar code data exceeds that available in the target device. The second embodiment cannot be used if the updating causes pieces of executable code to move relative to one another. When this happens, jump addresses and variable locations will be invalid throughout the entire program. In the third embodiment, a linker makes a single executable program from multiple relocatable object files. Relinking of the all object files solves this problem by recalculating all the external references to jump addresses and variable locations within each object file.

In this case, the symbol 14 is read and decoded, and an Object File Update flag added to the symbol indicates to the device 4 that the decoded data comprises relocatable object files to be linked with the original software file and written into the flash memory 20. The device 4 has loaded thereon a linker 19, which uses the new relocatable files and the original software file in the flash memory 20 to generate the updated software file 22 for writing into the flash memory 20 as required.

Tabular Data Revision The difference extractor 10 used with the partial replacement embodiment of FIG. 2 can only use the assignment operator to generate modification data for byte by byte direct substitution. However, the defined syntax of the modification data has additional operators, AND, OR or XOR, to enable modification of individual bits in the target device memory. Frequently, individual bits turn certain features in the target device on or off. Furthermore, groups of bits are also used in the configuration and parameterization of the target device. Therefore, in addition to revising executable program code as specified above, the present invention is quite useful in revising tabular data in the target device because of the ability of modify individual bits. In this case, the second embodiment described herein is particularly suitable for implementing such data reprogramming.

In addition to providing the ability to reprogram software files resident in a device such as a remote data terminal, the present invention can be advantageously implemented directly in a bar code scanner. Thus, the circuitry illustrated in the device 4 FIGS. 1–3 can be adapted to reside within the reader 3.

In addition, the present invention can be advantageously be implemented to update software files resident in a personal computer (PC). Scanning devices such as those based on CCD imaging technology are available as peripheral devices for PCs, which devices can be used to read two-dimensional bar code symbols encoded with file modification data in accordance with the present invention.

By implementing the present invention, software modifications to devices compatible with bar code readers can be easily attained. The device manufacturer can simply encode the revised program (or parts thereof) in accordance with any of the illustrative embodiments, and issue the PDF417 encoded symbol to all registered owners of the particular device, with instructions to simply scan in the accompanying symbol. As a result, the target devices are easily updated with the revised software at a minimal cost to the manufacturer and with negligible system down time for the user.

Although the preferred embodiments of the present invention have been described with the PDF417 symbology, it is understood that the principles of the invention can be attained with other types of symbologies and data transfer mechanisms. For example, matrix codes are two-dimensional codes which appear as a checkerboard array of black squares, rectangles, dots or hexagons on a field of white space. Presently, matrix codes are capable of being read only by CCD based reading devices, and are thus not as universal as the above-described PDF417 symbology.

We claim:

1. A system for modifying an original software file resident in a l microprocessor-controlled device comprising:
    a) a modification data generator for generating file modification data representative of the differences between the original software file and an updated software file including:
        (i) a difference extractor for comparing the original file with the updated file and for providing a list of addresses where the original file differs from the updated file and the updated bytes of data located at said addresses, and
        (ii) a record assembler for assembling a list of records representative of the updated byes, the addresses associated with the updated bytes, and an operation function indicative of one of several available modes of merging said updated bytes with the original file;
    b) an encoder for encoding the file modification data into a two-dimensional bar code symbol:
    c) a printer for printing the two-dimensional symbol onto a substrate,
    d) a bar code reader coupled to the microprocessor-controlled device for reading the encoded two-dimensional bar code symbol from the substrate and for decoding said symbol into the file modification data;

e) an update controller for providing software update identification and control, f) a merger for merging the file modification data with the original software file resident in the microprocessor-controlled device so as to generate updated portions representative of the differences between the original software file and the updated software file: and g) a replacer for replacing those portions of the original software file resident in the microprocessor-controlled device with the updated portions;

whereby the available modes of merging said updated bytes with the original file comprise an assignement operation in which the original byte is completely replaced with the updated byte, an AND operation in which selected bits of the original byte are set to zero, an OR operation in which selected bits of the original by te are set to one, and an EXCLUSIVE OR operation in which selected bits of the original byte are inverted.

2. The system of claim 1 wherein a) the two-dimensional bar code symbol includes at least two rows of codewords, with one row adjacent to and beneath another row, wherein each said codeword represents at least one information-bearing character and is selected from among a set of detectable mark/space patterns, wherein each said mark/space pattern has a determinable discriminator function value and comprises a pattern of marks and spaces, each said mark and space being representative of one of a plurality of different states, and wherein the codewords in each said row have codewords selected from one of a plurality of subsets of said mark/space patterns, each said subset comprising-mark/space patterns having discriminator function values that are mutually exclusive of discriminator values corresponding to the mark/space patterns comprising any other subset, and wherein b) said decoder comprises
   (i) a value determination for computing the discriminator function value for each of the scanned codewords;
   (ii) a row determinator, from the value of the computed discriminator function, the row containing each of the scanned codewords;
   (iii) a decoding section for decoding each of the scanned codewords to obtain a plurality of corresponding symbolic values; and
   (iv) a generator for generating a signal representative of the presence of each of said corresponding symbolic values in the determined row.

3. The system of claim 2 wherein the bar code further comprises a two-dimensional rastering laser-based scanner.

4. In a microprocessor-controlled device in which an original software file is located in a non-volatile memory, an apparatus for modifying the original software file comprising:

a) a bar code reader for reading a two-dimensional bar code symbol from a substrate, wherein said two-dimensional bar code symbol is encoded with the file modification data representative of data byte differences between the original software file and an updated software file including a number of records, each of said records comprising an address where the original file differs from the updated file, the updated data byes located at said address, and an operation function indicative of one of several available modes of merging said updated data bytes with the original file;

b) a decoder for decoding said symbol into the file modification data;

c) an update controller for providing software update modification and control;

d) a merger for merging the file modification data with the original software file resident in the microprocessor-controlled device so as to generate updated portions representative of the differences between the original software file resident in the microprocessor-controlled device with the updated portions, said merger including a function determinator for determining the indicated operation function;

whereby the available modes of merging said updated data bytes with the original file comprise an assignment operation in which the original data byte is completely replaced with the updated data byte, an AND operation in which selected bits of the original data byte are set to zero, an OR operation in which selected bits of the original data byte are set to one, and an EXCLUSIVE OR operation in which selected bits of the original data byte are inverted.

5. The apparatus of claim 4 wherein a) the two-dimensional bar code symbol includes at least two rows of codewords, with one row adjacent to and beneath another row, wherein each said codeword represents at least one information-bearing character and is selected from among a set of detectable mark/space patterns, wherein each said mark/space pattern has a determinable discriminator function value and comprises a pattern of marks and spaces, each said mark and space being representative of one of a plurality of different states, and wherein the codewords in each said row have codewords selected from one of a plurality of subsets of said mark/space patterns, each said subset comprising-mark/space patterns having discriminator function values that are mutually exclusive of discriminator values corresponding to the mark/space patterns comprising any other subset, and wherein b) said decoding means comprises
   (i) a value determinator for computing the discriminator function value for each of the scanned codewords;
   (ii) a row determinator, from the value of the computed discriminator function, the row containing each of the scanned codewords;
   (iii) a decoding section for decoding each of the scanned codewords to obtain a plurality of corresponding symbolic values; and
   (iv) a signal generator for generating a signal representative of the presence of each of said corresponding symbolic values in the determined row.

6. The apparatus of claim 5 wherein the bar code reader further comprises a two-dimensional rastering laser-based scanner.

7. An apparatus for generating a two-dimensional bar code symbol encoded with data indicative of revisions to be made to an original software file resident in a microprocessor-controlled device, said apparatus comprising:

a) a modification data generator for generating a file modification data representative of the differences between the original software file and an updated software file, said modification data generator including:
   (i) difference extractor for comparing the original file with the updated file and for providing a list of addresses where the original file differs from the updated file and the updated bytes of data located at said addresses, and (ii) an assembler for assembling a list of records representative of the updated bytes, the addresses associated with the updated bytes, and an operation function indicative of one of several available modes of merging said updated bytes with the original file;

b) an encoder for encoding the file modification data into a two-dimensional bar code symbol; and c) a printer for printing the two-dimensional symbol onto a substrate;

whereby the available modes of merging said updated bytes with the original file comprise an assignment operation in which the original byte is completely replaced with the updated byte, an AND operation in which selected bits of the original byte are set to zero, an OR operation in which selected bits of the original byte are set to one, and a n EXCLUSIVE OR operation in which selected bits of the original byte are inverted.

8. The apparatus of claim 7 wherein the two-dimensional bar code symbol includes at least two rows of codewords, with one row adjacent to and beneath another row, wherein each said codeword represents at least one information-bearing character and is selected from among a set of detectable mark/space patterns, wherein each said mark/space pattern has a determinable discriminator function value and comprises a pattern of marks and spaces, each said mark and space being representative of one of a plurality of different states, and wherein the codewords in each said row have codewords selected from one of a plurality of subsets of said mark/space patterns, each said subset comprising mark/space patterns having discriminator function values that are mutually exclusive of discriminator values corresponding to the mark/space patterns comprising any other subset.

9. A two-dimensional bar code symbol encoded with file modification data representative of the differences between an original software file resident in a microprocessor-controlled device and an updated software file, in which said file modification data comprises a list of records representative of the addresses where data bytes have been updated, the updated data bytes associated therewith, and an operation function indicative of one of several available modes of merging said updated bytes with the original file;

whereby the available modes of merging said updated bytes with the original file comprise an assignment operation in which the original byte is completely replaced with the updated byte, an AND operation in which selected bits of the original byte are set to zero, an OR operation in which selected bits of the original byte are set to one, and an EXCLUSIVE OR operation in which selected bits of the original byte are inverted.

10. A two-dimensional bar code symbol encoded with file modification data representative of the differences between an original software file resident in a microprocessor-controlled device and an updated software file, said said file modification data comprising a list of records representative of the addresses where data bytes have been updated, the updated data byes associated therewith, and an operation function indicative of one of several available modes of merging said updated bytes with the original file;

wherein the two-dimensional bar code symbol includes at least two rows of codewords, with one row adjacent to and beneath another row wherein each said codeword represents at least one information-bearing character and is selected from among a set of detectable mark/space patterns, wherein each said mark/space pattern has a determinable discriminator function value and comprises a pattern of marks and spaces, each said mark and space being representative of one of a plurality of different states, and wherein the codewords in each said row have codewords selected from one of a plurality of subsets of said mark/space patterns, each said subset comprising mark/space patterns having discriminator function values that are mutually exclusive of discriminator values corresponding to the mark/space patterns comprising any other subset;

wherein the available modes of merging said updated bytes with the original file comprise an assignment operation in which the original byte is completely replaced with the updated byte, an AND operation in which selected bits of the original byte are set to zero, an OR operation in which selected bits of the original byte are set to one, and an EXCLUSIVE OR operation in which selected bits of the original byte are inverted.

* * * * *